United States Patent Office 3,840,524
Patented Oct. 8, 1974

3,840,524
α-CYCLOALKYLBENZYL LACTAMIMIDES
J. Martin Grisar and George P. Claxton, Cincinnati, Ohio, assignors to Richardson-Merrell Inc., New York, N.Y.
No Drawing. Filed Apr. 25, 1973, Ser. No. 354,442
Int. Cl. C07d 27/04, 29/28, 41/04
U.S. Cl. 260—239 B    7 Claims

ABSTRACT OF THE DISCLOSURE

Novel α-cycloalkylbenzyl lactamimides are prepared which are useful as hypoglycemic agents.

FIELD OF THE INVENTION

This invention concerns new nitrogen-containing heterocyclic compounds, their preparation and their use as hypoglycemic agents.

DESCRIPTION OF PRIOR ART

Canadian Pat. 850,116 discloses 1 - lower alkyl-2-aralkylimino-methyleneimines having the formula:

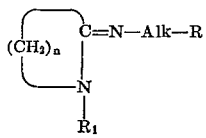

in which the symbols Alk represent cyclopropyl or a straight or branched alkylene chain having from 1 to 3 carbon atoms; R is phenyl or a substituted phenyl; $R_1$ is lower alkyl or benzyl; and $n$ is an integer from 3 to 5. The compounds of the present invention differ in that they have both an alicyclic group and a phenyl group attached to the same carbon atom and not attached to each other. Moreover, the compounds of the prior art are stated to possess anti-inflammatory activity, whereas still others possess central nervous system activity. There is no disclosure of the prior art compounds being useful as hypoglycemic agents.

U.S. Pat. 3,378,438 discloses compounds having the structure:

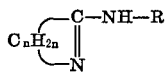

wherein R represents alkyl, cycloakyl, aryl or an aralkyl radical which can be either substituted or unsubstituted. The compounds of the present invention are not included in the prior are generic formula. The sole disclosure relating to the compounds of the present invention in the reference patent is to a single starting amine, α-cyclohexyl-benzylamine, column 2, line 71. The end compounds of the reference patent are stated to be useful as fungicidal agents; there is no disclosure that such compounds are useful as hypoglycemic agents.

Copending application U.S. Ser. No. 143,258, filed May 13, 1971, and now abandoned whose counterpart has been published as Belgian Pat. 783,271, describes substituted naphthylalkylene lactamimides having the formula:

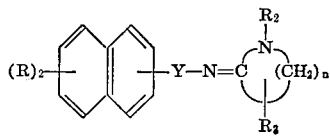

wherein each R group is hydrogen, halogen, trifluoromethyl, a straight or branched alkyl chain, alkoxy and nitro, and each R group may be the same or different; Y is a straight or branched alkylene chain and is optionally substituted with phenyl or substituted phenyl wherein the substituents on the substituted phenyl are selected from halogen and lower alkyl; $R_2$ is hydrogen or lower alkyl; $R_3$ is hydrogen, lower alkyl or halogen; and $n$ is an integer of from 3 to 11. Such compounds possess hypoglycemic, anticoagulant and diuretic activity. In contrast thereto, the compounds of the present invention differ in that they do not contain a naphthalene ring. They are further distinguished by a mandatory cycloalkyl substituent in a position which is alpha to the benzyl moiety, which substituent is lacking in the prior art.

Copending application Ser. No. 180,118, filed Sept. 13, 1971, now U.S. Pat. 3,783,162, whose counterpart has been published as Belgian Pat. No. 788,767, discloses benzhydryllactamimide derivatives having the formula:

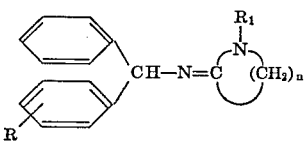

wherein R is hydrogen or lower alkoxy having from 1 to 6 carbon atoms; $R_1$ is hydrogen or lower alkyl having from 1 to 4 carbon atoms; and $n$ is an integer of from 3 to 11. Such compounds possess both hypoglycemic and diuretic activity. In contrast thereto, the compounds of the present invention differ in that they contain a mandatory cycloalkyl radical in lieu of an unsubstituted phenyl radical shown in the prior art.

SUMMARY OF THE INVENTION

This invention relates to novel heterocyclic benzyl lactamimides. More particularly, this invention relates to a class of benzyl lactamimides substituted with a cycloalkyl ring in the α-position of the benzyl radical, which compounds are useful for lowering blood sugar levels. Still more particularly, the compounds of this invention are represented by the general formula:

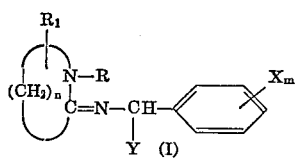

wherein $n$ is an integer of from 3 to 9; R is hydrogen or methyl; $R_1$ is hydrogen or lower alkyl having from 1 to 4 carbon atoms; Y is cycloalkyl having from 3 to 5 carbon atoms; X is selected from the group consisting of hydrogen, lower alkoxy having from 1 to 4 carbon atoms and lower alkyl having from 1 to 4 carbon atoms; $m$ is an integer of from 1 to 2; and the pharmaceutically acceptable acid addition salts thereof.

In general the compounds of this invention are prepared by reacting an α-cycloalkylbenzylamine with a lactim ether to form a lactamimide. Alternatively, the instant compounds may also be prepared by forming a lactam complex and reacting this complex with an appropriate primary amine.

A variety of compositions are also included within the scope of the present invention which are useful in the control of hyperglycemic conditions.

DETAILED DESCRIPTION OF THE INVENTION

For convenience and uniformity all of the compounds of the present invention are represented as 2-substituted imino heterocycles as shown in Formula (1) above. Such compounds and their acid addition salts can also exist in their tautomeric form as illustrated by the following formula:

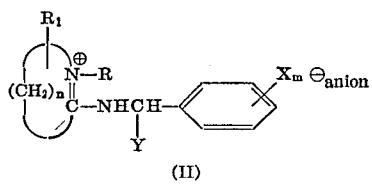

(II)

This tautomerism has been discussed by R. Kwok and P. Pranc, J. Org. Chem., 32, (1967) When represented in this fashion, the compounds of the present invention would also be named differently, as for example, 2-[(α-cyclopropylbenzyl)imino]hexahydro - 1H-azepine hydrochloride would be named as 7-[(α-cyclopropylbenzyl) amino]-3,4,5,6-tetrahydro-2H-azepine.

In solution under conditions of therapeutuic utility, the proportion of each tautomeric form, as expressed by the delocalization of the positive charge between the two nitrogen atoms, will be dependent upon various factors including the nature of the side chain substitutents, the pH of the medium, and the temperature. This equilibrium state can be conveniently represented by the following formula:

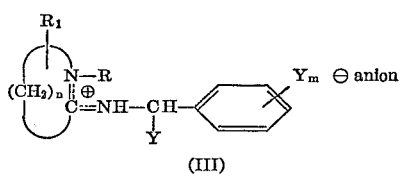

(III)

Thus, under a given set of conditions the instant compounds are present in either of their tautomeric forms as illustrated by Formulas (I) and (II) or in mixtures of these tautomeric forms, the compositions of which are dependent upon such factors as the nature of the various substituents and the physical environment of the molecule.

As seen in Formula (I) above, the heterocyclic portion of the molecule may vary in ring size from 5 to 11 atoms, one member of which must be nitrogen. Thus the compounds of the present invention include such heterocyclic rings as pyrrolidine, piperidine, hexahydro-1H-azepine, octahydroazocine, octahydro-1H-azonine, azacyclodecane, and azacycloundecane.

The compounds of the present invention include substituted derivatives of the heterocyclic moiety at either the nitrogen atom or at any of the cyclic carbon atoms. The substituents at the nitrogen atom, as represented by the symbol R, may be either hydrogen or methyl. The monosubstituents located at the carbon containing members of the heterocyclic ring may be either hydrogen or lower alkyl and are represented by the symbol $R_1$. The expression "lower alkyl" represents either a straight or branched chain alkyl group having from 1 to 4 carbon atoms and include such radicals as methyl, ethyl, propyl, isopropyl, butyl, Sec.-butyl and t-butyl.

All of the compounds of this invention contain a substituted benzyl moiety. The aliphatic carbon atom is substituted, as represented by the symbol Y, with either a cyclopropyl, cyclobutyl or cyclopentyl ring. The aromatic portion of the benzyl moiety can be either substituted or unsubstituted as represented by the symbol X. Substitution occurs in the form of either a mono or di-substituted lower alkyl group or as a mono or di-substituted lower alkoxy group. In either event the expression "lower alkyl" or "lower alkoxy" refers to groups having from 1 to 4 carbon atoms as previously enumerated.

A preferred subclass of lactamimides exist in which the symbol Y is cyclopropyl and the symbols R and $R_1$ both represent hydrogen as illustrated in the following formula:

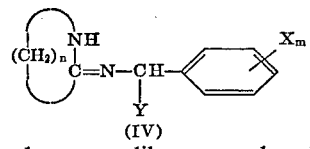

(IV)

Such compounds are readily prepared and demonstrate good activity as illustrated in Example XIII.

Illustrative specific compounds encompassed by formula (1) above include:

2-[(α-cyclopropylbenzyl)imino]piperidine;
2[(α-cyclopropyl-m-methoxybenyl)imino]pyrrolidine;
2[(α-cyclopropyl-p-butylbenzyl)imino]octahydro-1H-azonine;
2[(α-cyclopropyl-t-butoxybenzyl)imino]hexahydro-1H-azepine;
2-[(α-cyclobutylbenzyl)imino]piperidine;
2[(α-cyclobutyl-2,4-diethylbenzyl)imino]octahydroazocine;
2-[(α-cyclopropylbenzyl)imino]-1-methyl-pyrrolidine;
2-[(α-cyclopropyl-2,4-dimethylbenzyl)imino]-1-methylhexahydro-1H-azepine;
4-ethyl-2[(α-cyclobutylbenzyl)imino]pyrrolidine;
6-propyl-2[(α-cyclopentylbenzyl)imino]hexahydro-1H-azepine;
5-t-butyl-2[(α-cyclopropylbenzyl)imino]octahydrozocine;
2-[(α-cyclobutyl-3,5-diisopropoxybenzyl)imino]pyrrolidine;
2-[(α-cyclopentylbenzyl)imino]octahydro-1H-azonine;
2-[(α-cyclopentyl-2,4-dipropoxybenzyl)imino]piperidine;
2-[(α-cyclopentyl-2,3-dibutylbenzyl)imino]octahydroazocine; and
2-[(α-cyclopentyl-p-ethoxybenzyl)imino]hexahydro-1H-azepine.

The expression "pharmaceutically acceptable acid addition salts" refers to any non-toxic organic or inorganic acid addition salts of the base compounds represented by Formula (I). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids. Illustrative of such acids are, for example, acetic propionic, glycolic, lactic, pyruvic, malonic, succinic, glutaric, fumaric, malic, tartaric, citric, ascorbic, maleic hydroxymaleic benzoic p-hydroxybenzoic, phenylacetic, cinnamic, salicylic, 2-phenoxybenzoic and sulfonic acids such as methanesulfonic acid and 2-hydroxyethanesulfonic acid. Either the mono or the di-acid salts can be formed, and such salts can be utilized in either a hydrated or a substantially anhydrous form.

The α-cyclobenzyl lactamimides of this invention in which the symbol R represents hydrogen are prepared by reacting an excess amount of a lactim ether with an α-cycloalkylbenzylamine, as illustrated in the following reaction scheme:

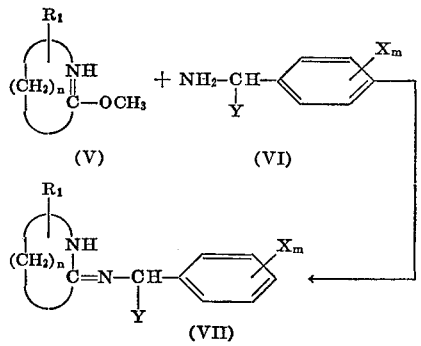

The remaining symbols $n$, $R_1$, $Y$, $X$, and $m$ have the values previously assigned. The reaction is conducted in a manner similar to that reported by R. E. Benson and T. L. Cairns, J. Am. Chem. Soc., 70, 2115–8 (1948), and may be carried out either in the presence or in the absence of a solvent. Suitable solvents include the lower alcohols such as methanol or ethanol, benzene, toluene and the like, with the lower alcohols being the solvents of choice. A basic or acidic catalyst such as a tertiary amine or hydrogen chloride may be added to the reaction mixture. In general the hydrochloride salt of the reactant primary amine is preferred for use in this reaction. The temperature of the reaction mixture can vary from −40° C. to 180° C., preferably the temperature ranges from about 15° C. to 25° C. The reaction time varies from a period of from about 1 hour to about 60 days depending upon the temperature of the reaction, the reactant primary amine, and more particularly the degree of steric hindrance of the amine.

Compounds of this invention in which the symbol R may be either hydrogen or methyl may also be prepared using a complex of an appropriate lactam with phosphorous oxychloride, phosgene, borontrifluoride etherate, dimethyl sulfate, hydrogen halide or a combination of two or more such reagents. This reaction has been studied by H. Bredereck in a series of articles in Chem. Ber., 1953–1968, particularly in volume 94, 2278 (1961) and volume 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, tetrachloroethylene or the like. The reaction temperature is limited by the boiling point of the solvent, however, in some cases it is advantageous to carry out the reaction at room temperature or with cooling at 0 to −40° C. depending on the reactants.

Also by catalytic hydrogenation of an appropriate aminopyridine derivative as described by T. B. Grave, J. Am. Chem. Soc., 46, 1460 (1924), M. Freifelder et al., J. Org. Chem., 29, 3730 (1964) and L. Birkofer, Ber., 75, 429 (1942), compounds of this invention containing a pentamethylenimine moiety may be obtained.

The lactim ethers (V) which find use in this reaction are prepared from corresponding commercially available lactams by methods known to the art. Thus, for example, the reaction of an appropriate lactam with dimethyl sulfate in a solvent such as benzene, toluene or xylene at the reflux temperature of the particular solvent selected for a period of from 2 to 24 hours results in the formation of the corresponding O-methylactim ether.

The primary amines (VI) find use in the present invention either as the free base or the hydrochloride salt, and can be prepared by several known methods. Thus, for example, a Grignard reagent can be reacted with a cycloalkyl cyanide and the resulting ketimine complex reduced in situ with lithium aluminum hydride. Alternatively, these amines can be obtained by the Leuckart reaction whereby the appropriate acetophenone is heated with ammonium formate to form the desired amine.

The compounds of the present invention possess hypoglycemic properties which make them useful in the reduction of blood sugar. These compounds are active when administered orally and thus, they can be employed to regulate the blood sugar levels of diabetic patients.

The compounds of this invention are administered to animals, mammals or humans either *per se* or they are administered in combination with conventional pharmaceutical carriers in suitable dosage unit forms. Suitable dosage unit forms include oral preparations, as for example, tablets, capsules, powders, granules, oral solutions or suspensions, sublingual and intrabuccal preparations, as well as parenteral fluid dosage forms useful for subcutaneous, intramuscular or intravenous administration. The quantity of active ingredient administered in each dosage form will differ depending upon the type of unit dosage, the type of animal, weight and the effect desired. Thus, the useful range of administration can vary from about 0.1 mg./kg. to about 100 mg./kg. of body weight per day. Each unit dose can contain anywhere from about 25 mg. to over 500 mg. of active ingredient contained with a significant quantity of pharmaceutical carrier. Such doses may be administered from 1 to 4 times daily.

In preparing solid compositions such as tablets, the principal active ingredient is mixed with conventional pharmaceutical excipients such as gelatin, starches, lactose, magnesium stearate, talc, acacia, dicalcium phosphate and functionally similar materials. Tablets can be laminated, coated or otherwise compounded to provide for a prolonged or delayed action and to release a predetermined successive amount of medication. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens as preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg. to about 3 grams of the active ingredient in a vehicle consisting of a mixture of nonvolatile liquid polyethylene glycols which are soluble in both water and organic liquids and which have molecular weights ranging from about 200 to about 1500. Such solutions may advantageously contain suspending agents, such as sodium carboxymethylcellulose, methylcellulose, polyvinylpyrrolidone or polyvinyl alcohol. Additionally, they may contain bactericidal and fungicidal agents, as for example, parabens, benzyl alcohol, phenol or thimerosal. If desired, isotonic agents can be included, such as sugar or sodium chloride, as well as local anesthetics, stabilizing or buffering agents. In order to further enhance stability, the parenteral compositions may be frozen after filling and water removed by freeze-drying techniques well known in the art, enabling such dry, lyophilized powders to be reconstituted immediately prior to their use.

The following preparation and examples are illustrative of the novel compounds of the present invention and their compositions.

EXAMPLE I 2,3,4,5,6,7-Hexahydro-8-Methoxyazocine

A solution of 1.6 moles of octahydroazocin-2-one in benzene is heated to its reflux temperature and 1.58 moles of dimethyl sulfate added via dropwise addition. The mixture is refluxed for approximately 18 hours and a 50% aqueous potassium carbonate solution cautiously added. The resulting benzene solution is separated, washed with a saturated solution of sodium chloride, dried over anhydrous sodium sulfate and the 2,3,4,5,6,7-hexahydro-8-methoxyazocine distilled therefrom, B.P. 44–8° C. (1.6 mm.).

EXAMPLE II

α-Cyclopropylbenzylamine Hydrochloride

To a solution of 0.47 mole of cyclopropyl cyanide dissolved in 50 ml. of anhydrous ether is added a suspension of phenylmagnesium bromide, prepared by the addition of 0.56 mole of magnesium turnings to 0.56 mole of bromobenzene in ether. The mixture is refluxed for a period of two hours, cooled, and is added to a suspension of 0.56 mole of lithium aluminum hydride in 2.5 liters of anhydrous ether. The resulting mixture is refluxed for a period of 24 hours, cautiously decomposed by the addition of 21 ml. of water, 21 ml. of 15% sodium hydroxide solution and 64 ml. of water and filtered. The filtrate is extracted with ether, dried over anhydrous sodium sulfate, an excess of ethereal hydrochloric acid added, and the α-cyclopropylbenzylamine isolated therefrom as the hydrochloride salt. Recrystallization from an isopropyl alcohol-water mixture yielded a product having a M.P. 224–5° C. (dec.).

EXAMPLE III

2-[(α-Cyclopropylbenzyl)Imino]Hexahydro-1H-Azepine

A slurry of 17 g. (0.093 mole) of a substituted benzylamine, α-cyclopropylbenzylamine in the form of the hydrochloride salt, and 17 ml. (0.12 mole) of the lactim ether O-methylcaprolactim, is permitted to remain at room temperature with occasional stirring for a period of 6 days. Additional portions of absolute ethanol are added as required in order to permit occasional stirring to take place. The reaction mixture is cooled to −20° C., filtered and the precipitate washed with ether. The 2-[(α-cyclopropylbenzyl)imino]hexahydro-1H-azepine is obtained as its hydrochloride salt. A sample recrystallized twice from an acetone-methanol mixture melts at 248.5–249° C.

EXAMPLES IV–XI

Following essentially the same procedure as in Example III, the following reactants are substituted for α-cyclopropylbenzylamine and O-methylcaprolactim:

| | Substituted benzylamines | Lactim ethers |
|---|---|---|
| IV | α-Cyclopropylbenzylamine | O-methylvalerolactim. |
| V | α-Cyclopropyl-p-methoxybenzylamine | O-methylcaprolactim. |
| VI | α-Cyclopropylbenzylamine | O-methylenantholactim. |
| VII | α-Cyclopropyl-2,4-dimethylbenzylamine | O-methylcaprolactim. |
| VIII | α-Cyclopropyl-p-methoxybenzylamine | O-methyl-5-t-butylcaprolactim. |
| IX | α-Cyclopentylbenzylamine | O-methylcaprolactim. |
| X | α-Cyclopropyl-2,4-dimethylbenzylamine | O-methylcapryllactim. |
| XI | α-Cyclobutylbenzylamine | O-methylcaprolactim. |

The following products are respectively obtained:

IV  2-[(α-cyclopropylbenzyl)imino]piperidine hydrochloride; M.P. 174–5° C.

V  2-[(α-cyclopropyl-p-methoxybenzyl)imino]hexahydro-1H-azepine hydrochloride; M.P. 192–194° C.

VI  2-[(α-cyclopropylbenzyl)imino]octahydroazocine hydrochloride, M.P. 257.5–259.5° C.

VII  2-[(α-cyclopropyl-2,4-dimethylbenzyl)imino]hexahydro-1H-azepine hydrochloride, M.P. 228–230° C.

VIII  5-tert-butyl-2-[(α-cyclopropyl-4-methoxybenzyl)-imino]hexahydro-1H-azepine hydrochloride, M.P. 232–234° C.

IX  2-[(α-cyclopentylbenzyl)imino]hexahydro-1H-azepine hydrochloride, M.P. 281–284° C.

X  2-[(α-cyclopropyl-2,4-dimethylbenzyl)imino]octahydro-1H-azonine hydrochloride, M.P. 217–218° C.

XI  2-[(α-cyclobutylbenzyl)imino]hexahydro-1H-azepine hydrochloride, M.P. 271–273° C.

EXAMPLE XII

2-[(α-Cyclopropylbenzyl)Imino]1-Methylpiperidine Hydrochloride

To 25.3 g. (0.223 mole) of 1-methyl-2-piperidone in 250 ml. of benzene is added 34.1 g. (0.223 mole) of phosphorus oxychloride over a period of 20 minutes. The resulting mixture is stirred at room temperature for approximately 4 hours. Then 41.0 g. (0.223 mole) of α-cyclopropylbenzylamine hydrochloride is added, the mixture is stirred at room temperature for an additional 1 hour and at its reflux temperature (80° C. for 4 hours. The reaction mixture is cooled overnight and the layers separated. The benzene solution is washed with a 2 N sodium hydroxide solution, dried over anhydrous sodium sulfate, and the solvent evaporated. The residue is treated with 1 equivalent of isopropanolic hydrogen chloride and the product that crystallizes is recrystallized from isopropanol to yield 2-[(α-cyclopropylbenzyl)imino]-1-methylpiperidine hydrochloride.

EXAMPLE XIII

The following example is illustrative of the hypoglycemic activity for the compounds of the present invention.

Male rats of the Charles River C.D. strain each weighing approximately 120 to 140 grams are fasted for 15 hours prior to the study. The animals are injected subcutaneously with 1 g./kg. of body weight of glucose in 0.5 ml. of 0.9% saline solution. Immediately following the glucose injection, the test compound is administered to the animal by oral intubation using a vehicle of 0.5 ml. of carboxymethylcellulose. Two hours after the administration of the compound, blood is withdrawn from the test animal and a quantitative analysis for plasma glucose is performed by means of the ultramicro glucose oxidase procedure as described by L. P. Cawley et al., Am. J. Clin. Path., 32, 195–200 (1959). Animals receiving the carboxymethylcellulose vehicle without the test compound serve as controls. The compound 2-[(α-cyclopropyl-2,4-dimethylbenzyl)-imino]octahydro-1H-azonine hydrochloride administered to glucose primed rats at levels of 12.5 and 100 mg./kg. of body weight produces a percentage reduction in plasma glucose of 17% and 61% respectively.

EXAMPLE XIV

Preparation of a Tablet Formulation

One thousand tablets for oral use, each containing 25 mg. of 2-[(α-cyclopropyl-2,4-dimethylbenzyl)-imino]octahydro-1H-azonine hydrochloride are prepared according to the following formulation:

| | Grams |
|---|---|
| (a) 2-[(α - cyclopropyl-2,4-dimethylbenzyl)-imino]octahydro-1H-azonine hydrochloride | 25 |
| (b) Dicalcium phosphate | 150 |
| (c) Methylcellulose, U.S.P. (15 cps.) | 6.5 |
| (d) Talc | 20 |
| (e) Calcium stearate | 2.5 |

The 2-[(α-cyclopropyl-2,4-dimethylbenzyl)-imino]octahydro-1H-azonine hydrochloride and dicalcium phosphate are mixed well, granulated with a 7.5% aqueous solution of methylcellulose, passed through a No. 8 screen and carefully dried. The dried granules are passed through a No. 12 screen, blended with talc and calcium stearate and compressed into tablets.

EXAMPLE XV

Preparation of a Capsule Formulation

One thousand two-piece hard gelatin capsules for oral use each containing 100 mg. of 2-[(α-cyclopropyl-2,4-dimethylbenzyl)-imino]octahydro - 1H - azonine hydrochloride are prepared from the following ingredients:

| | Grams |
|---|---|
| (a) 2-[(α - cyclopropyl-2,4-dimethylbenzyl)-imino]octahydro-1H-azonine hydrochloride | 100 |
| (b) Lactose, U.S.P. | 100 |
| (c) Starch, U.S.P. | 10 |
| (d) Talc, U.S.P. | 5 |
| (e) Calcium stearate | 1 |

The finely powdered materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed directly as a powder into the capsule.

EXAMPLE XVI

Preparation of a Parenteral Solution

A sterile aqueous suspension suitable for parenteral use is prepared from the following ingredients:

| | Grams |
|---|---|
| (a) 2-[(α-cyclopropyl - 2,4 - dimethylbenzyl)imino] octahydro-1H-azonine hydrochloride | 1 |
| (b) Polyethylene glycol 4000, U.S.P. | 3 |
| (c) Sodium chloride | 0.9 |
| (d) Polyoxyethylene derivatives of sorbitan monooleate (Tween 80), U.S.P. | 0.4 |
| (e) Sodium metabisulfite | 0.1 |
| (f) Methylparaben, U.S.P. | 0.18 |
| (g) Propylparaben, U.S.P. | 0.02 |
| (h) Water for injection q.s. to 100 ml. | |

The parabens, sodium metabisulfite, and sodium chloride are dissolved in approximately one-half the volume of water for injection at 80° C. with stirring. The solution is cooled to below 40° C. and the active ingredient is dissolved therein followed by the polyethylene glycol 4,000 and the polyoxyethylene derivatives of sorbitan monooleate. The cooled solution is adjusted to the final volume with water for injection and is then sterilized by sterile filtration through a suitable filter. Each one ml. of solution contains 10 mg. of 2-[(α-cyclopropyl-2,4-dimethylbenzyl)-imino]octahydro-1H-azonine hydrochloride as the active ingredient.

What is claimed is:

1. An α-cycloalkylbenzyl lactamimide having the formula

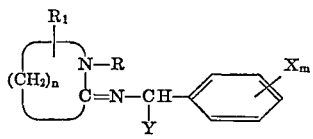

wherein $n$ is an integer of from 3 to 9; R is hydrogen or methyl; $R_1$ is hydrogen or lower alkyl having from 1 to 4 carbon atoms; Y is cycloalkyl having from 3 to 5 carbon atoms; X is selected from the group consisting of hydrogen, lower alkoxy having from 1 to 4 carbon atoms and lower alkyl having from 1 to 4 carbon atoms; $m$ is an integer of from 1 to 2; and the pharmaceutically acceptable acid addition salts thereof.

2. A compound of Claim 1 in which R and $R_1$ are both hydrogen and Y is the cyclopropyl radical.

3. A compound of Claim 1 which is 2[(α-cyclopropylbenzyl)imino]hexahydro-1H-azepine and its pharmaceutically acceptable acid addition salts.

4. A compound of Claim 1 which is 2-[(α-cyclopropylbenzyl)imino]octahydroazocine hydrochloride and its pharmaceutically acceptable acid addition salts.

5. A compound of Claim 1 which is 2-[(α-cyclopropyl-2,4-dimethylbenzyl)imino]octahydro-1H-azonine and its pharmaceutically acceptable acid addition salts.

6. A compound of Claim 1 which is 2-[(α-cyclobutylbenzyl)imino]hexahydro-1H-azepine hydrochloride and its pharmaceutically acceptable acid addition salts.

7. A compound of Claim 1 which is 2-[(α-cyclopentylbenzyl)imino]hexahydro-1H-azepine hydrochloride and its pharmaceutically acceptable acid addition salts.

References Cited

FOREIGN PATENTS 850,116   8/1970   Canada _____ 260—239 B

ALTON D. ROLLINS, Primary Examiner

M. L. BERCH, Assistant Examiner

U.S. Cl. X.R.

260—239 BE, 293.78, 296 R, 326.5 L, 326.85, 326.9; 424—244, 267, 274

UNITED STATES PATENT OFFICE
CERTIFICATE OF CORRECTION

PATENT NO. : 3,840,524
DATED : October 8, 1974
INVENTOR(S) : J. Martin Grisar and George P. Claxton It is certified that error appears in the above-identified patent and that said Letters Patent are hereby corrected as shown below:

Column 3, formula (III), line 30, "$Y_m$" should read --$X_m$--.

Column 4, line 14, "methoxybenyl" should read --methoxybenzyl--.

Column 4, line 29, "zocine" should read --azocine--.

Column 4, lines 48 and 49, "acetic propionic" should read --acetic, propionic--.

Column 4, lines 50 and 51, "maleic hydroxymaleic benzoic p-hydroxybenzoic," should read --maleic, hydroxymaleic, benzoic, p-hydroxybenzoic,--.

Signed and sealed this 10th day of June 1975.

(SEAL)
Attest:

RUTH C. MASON
Attesting Officer

C. MARSHALL DANN
Commissioner of Patents
and Trademarks